April 5, 1966 F. KUYT 3,245,084

MAGNETICALLY BIASED RECORDING STYLUS

Filed March 23, 1964

FRITS KUYT
*INVENTOR.*

BY Arthur L. Nelson
Frank C. Parker
ATTORNEYS

United States Patent Office 3,245,084
Patented Apr. 5, 1966

3,245,084
MAGNETICALLY BIASED RECORDING STYLUS

Frits Kuyt, Rochester, N.Y., assignor to Bausch & Lomb Incorporated, Rochester, N.Y., a corporation of New York Filed Mar. 23, 1964, Ser. No. 353,810
4 Claims. (Cl. 346—139)

This invention relates to a recording stylus and more particularly to a magnetically controlled stylus for operation with a recording device.

Recording devices generally require some adjustment in the pressure of the pen or stylus as it engages the recording surface. A recording medium is usually backed by a hard surface to permit a legible recording of information. The use of a pressure sensitive paper requires a more accurate adjustment and control of the pressure of the stylus on the recording medium. Accordingly this invention provides a simple adjustable means for controlling the pressure of a hardened stylus on the recording media of a recording device.

It is an object of this invention to provide a magnetically controlled stylus for recording information.

It is another object of this invention to control the pressure through magnetic means by varying the air gap and using a hard surface stylus engaging the recording medium.

It is a further object of this invention to use a permanent magnet associated with a stylus forming the magnetic air gap with a platen of magnetic material with mechanical means to vary the length of the air gap.

The objects of this invention are accomplished by providing a supporting means on a recording device for supporting a stylus. Associated with the stylus is a permanent magnet with means for shifting the relative position of the magnet axially with the stylus. The lower surface of the magnet moves with the stylus in close proximity to a platen of magnetic material. Mechanical means are provided for moving the magnet relative to the stylus thereby increasing the air gap between the platen and the magnet and decreasing the magnetic force and the pressure of the stylus on the recording medium.

The preferred embodiment of this invention is described in the subsequent paragraphs and illustrated in the attached drawings.

Figure 1:
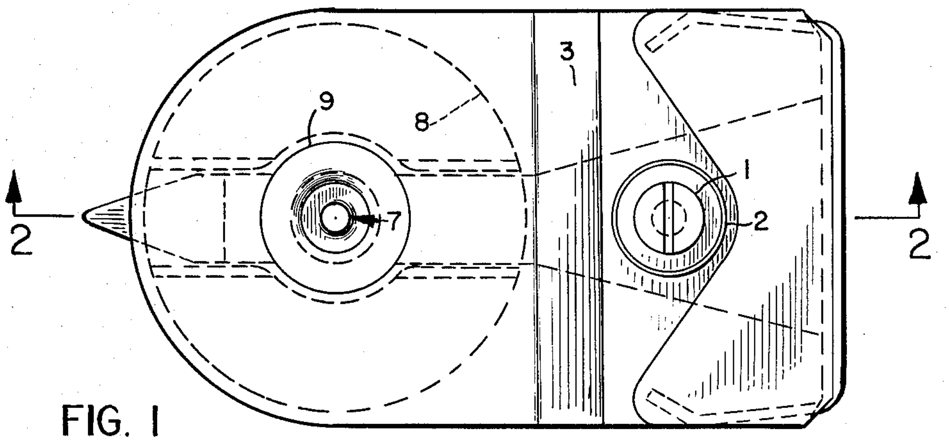
FIG. 1 is a plan view of the stylus assembly.
Figures 2, 3:
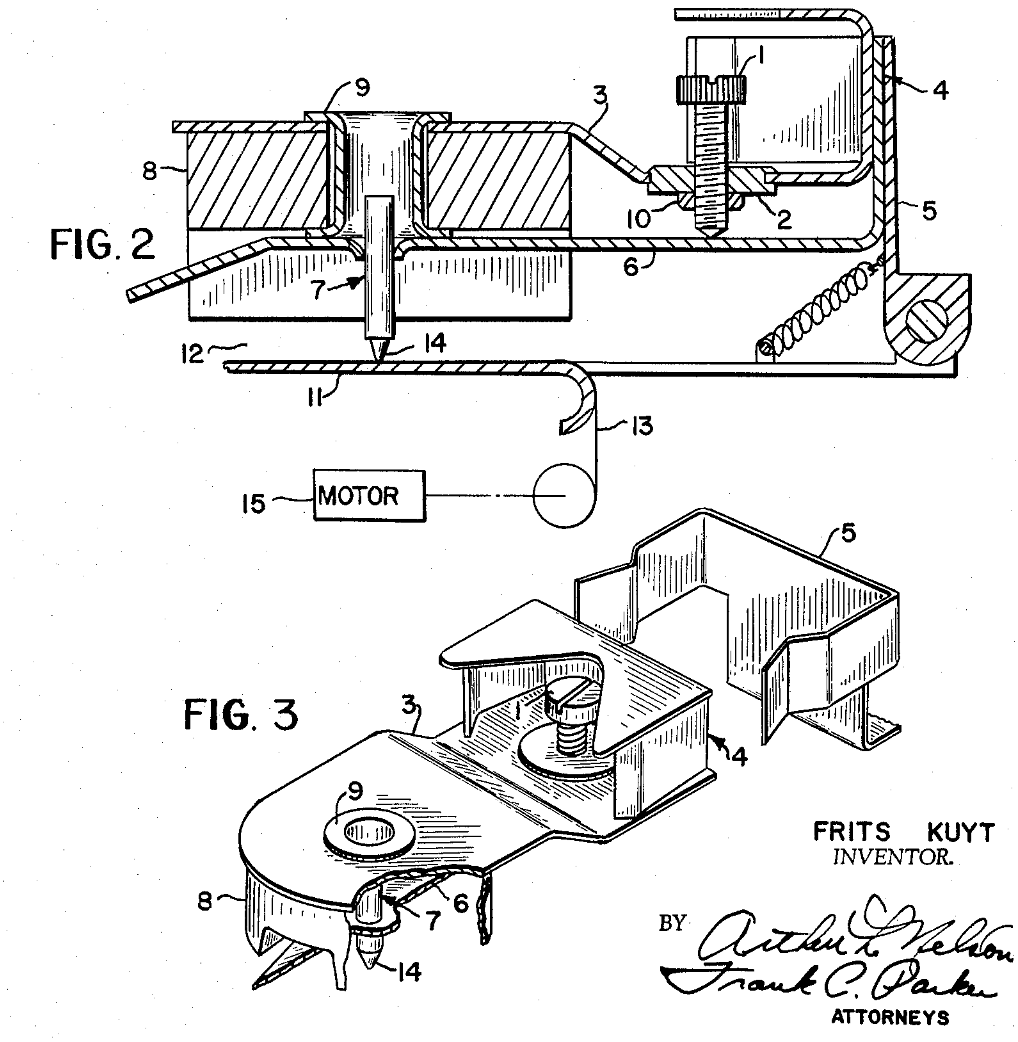
FIG. 2 is a cross section view taken on line 2—2 of FIG. 1.
FIG. 3 is a three dimensional view with portions broken away to illustrate the relative positions of the various components in the stylus assembly.

Referring to FIG. 1 the plan view of the stylus is illustrated. An adjusting screw 1 threadedly engages the disk 2 which is riveted onto the magnet arm 3. The magnet arm 3 is an integral part of the bracket 4 which is adapted for reception in a supporting means 5. The supporting means is supported in a manner to permit the retraction of the stylus assembly from a recording position when not in use. The bracket 4 also includes the stylus arm 6 which extends generally parallel with the magnet arm 3. A stylus 7 is fastened to one end of the arm 6 and extends downwardly as viewed in FIG. 2.

The magnet arm 3 supports the permanent magnet 8 by the means of the rivet 9. The permanent magnet 8 may be replaced with an electro-magnet however, the permanent magnet is a more simplified version of the invention. An electro-magnet would also provide in combination with an electrical coil a variable current control for changing the flux density and thereby varying the electro-magnet force and accordingly the pressure of the stylus on the recording medium.

The bracket 4 which is formed by the stylus arm 6 and the magnet arm 3 also carries the adjusting screw 1. The adjusting screw 1 threadedly engages the plate 2 and is locked in its position by the lock nut 10. The screw 1 has a portion extending intermediate the two arms 3 and 6 which when rotated will provide a biasing force to separate the two arms 3 and 6. The stylus arm 1 remains in the same position relative to the platen 11 which is formed of a magnetic material such as iron or steel. As the magnet arm 3 is raised relative to the stylus 7 the air gap 12 intermediate the lower end of the magnet 8 and the platen 11 is lengthened. This accordingly reduces the magnetic force drawing the stylus 7 in engagement with the recording medium 13 on the top side of the platen. The adjustment of the air gap is readily accomplished with an infinite degree of adjustment of the pressure of the stylus 7 on the recording medium 13.

The stylus 7 may be constructed of any material or may be a pen using ink to record the information on the medium 13. The tip 14 however, when used with a pressure sensitive paper as a recording medium 13 is preferably made of diamond. This provides a long wearing quality and substantially reduces any irregularities on the tip of the stylus which may damage a pressure sensitive paper.

The device will be described in the following paragraphs.

The supporting means 5 may be pivotally supported on its lower portion to facilitate withdrawal of the stylus assembly from the platen 11 when not in use. The stylus assembly is illustrated in the recording position in FIG. 2. In this position the stylus 7 engages the recording medium 13 which follows along the upper surface of the platen 11 in response to energization of the motor 15. The recording of information is supplied by a motor means driving the stylus assembly in a vertical direction as viewed in FIG. 1.

Considering the recording medium 13 to be a pressure sensitive paper it is imperative that the pressure of the stylus point 14 on the recording paper 13 be properly adjusted. The screw 1 which is supported in the magnet arm 3 is screwed to a contacting position with the stylus arm 6 and biases the magnet vertically away from the platen 11 to decrease the pressure of the stylus on the paper. This will create a spaced relationship of the magnet 8 and the upper surface of the platen 11. The greater the space between the magnet 8 and the platen 11 the greater the air gap 12 and consequently the less the magnetic force and the less the pressure of the stylus on the paper. To increase the magnetic force the air gap 12 is reduced causing a greater flux density passing through the magnet, the air gap and the platen 11. The platen 11 must be of a magnetic material to form part of the magnetic circuit.

The preferred embodiment of this invention is illustrated and described and it is understood that other embodiments might be devised which might fall within the scope of the attached claims which define the scope of the invention.

I claim:

1. A recording device including a platen of magnetic material, a stylus, means supporting said stylus for engagement with said platen, a magnetic means mounted on said means supporting said stylus for movement relative to said platen and forming a magnetic circuit with said platen, adjusting means on said means supporting said stylus adjustably controlling the length of air gap and the flux density in the magnetic circuit to vary the pressure of said stylus on said platen.

2. A recording device including a platen of magnetic material, a stylus means supported on said recording device comprising a bracket having a generally parallel extending magnetic arm and stylus arm, a magnet supported on said magnet arm, a stylus supported on said stylus arm engaging said platen, adjusting means biasing said arms in variable spaced relation relative to each other thereby increasing the air gap intermediate said magnet and said platen to vary the pressure of the stylus on a recording medium associated with said platen.

3. A recording device including, a platen formed of a magnetic material, means supporting a stylus on said recording device including, an arm extending from said supporting means supporting a stylus in engaging position with said platen, a second arm adjustably supporting a magnet positioned to form an air gap intermediate said magnet and said platen, adjustable means biasing said magnet and said stylus in a variable spaced relation relative to each other to thereby selectively and alternatively increase or decrease the air gap intermediate said magnet and said platen and control the pressure on a recording medium associated with said platen.

4. A recording device including a ferric metal platen, supporting means supporting a stylus bracket on said recording device, a stylus arm extending from said supporting means supporting a diamond tip stylus, a parallel extending magnet arm supporting a magnet adjacent said stylus forming an air gap intermediate said magnet and said platen, means supported on one of said arms biasing said arms in spaced relation relative to each other to control the length of air gap intermediate said magnet and said platen to thereby control the magnetic force and the pressure of the stylus tip on a recording medium associated with said platen.

References Cited by the Examiner

UNITED STATES PATENTS

| | | | |
|---|---|---|---|
| 613,811 | 11/1898 | Walfe | 340—140 |
| 2,539,784 | 1/1951 | Kleber | 274—1 |
| 2,785,039 | 3/1957 | Artzt. | |
| 2,955,895 | 10/1960 | Buoymaster et al. | 346—139 |

LEO SMILOW, *Primary Examiner.*